No. 635,124. Patented Oct. 17, 1899.
F. P. BULLARD.
MACHINE FOR STRETCHING UPPERS.
(Application filed Jan. 3, 1899.)
(No Model.) 3 Sheets—Sheet 2.
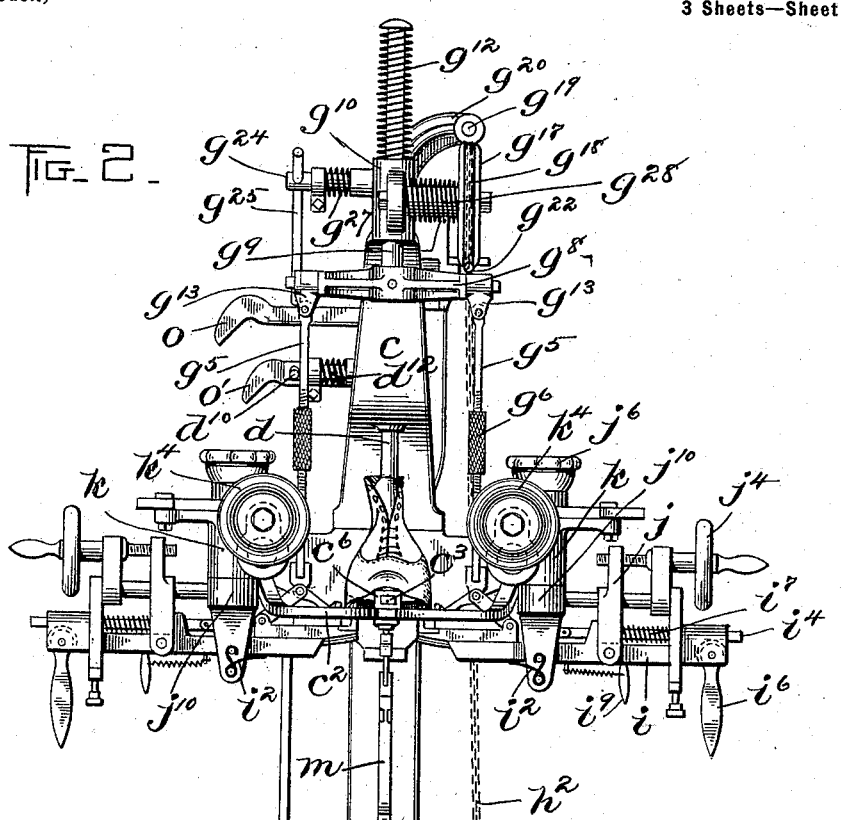
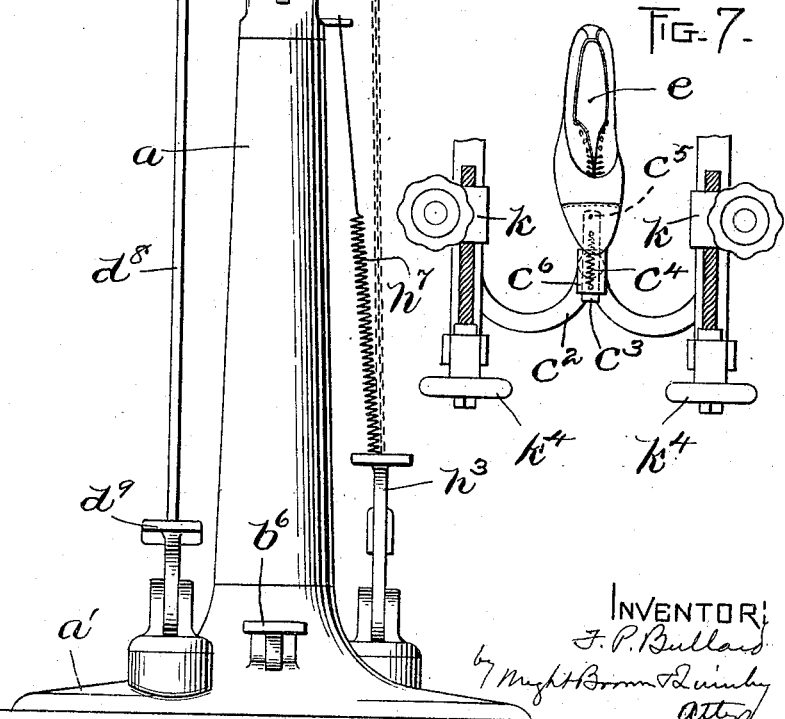

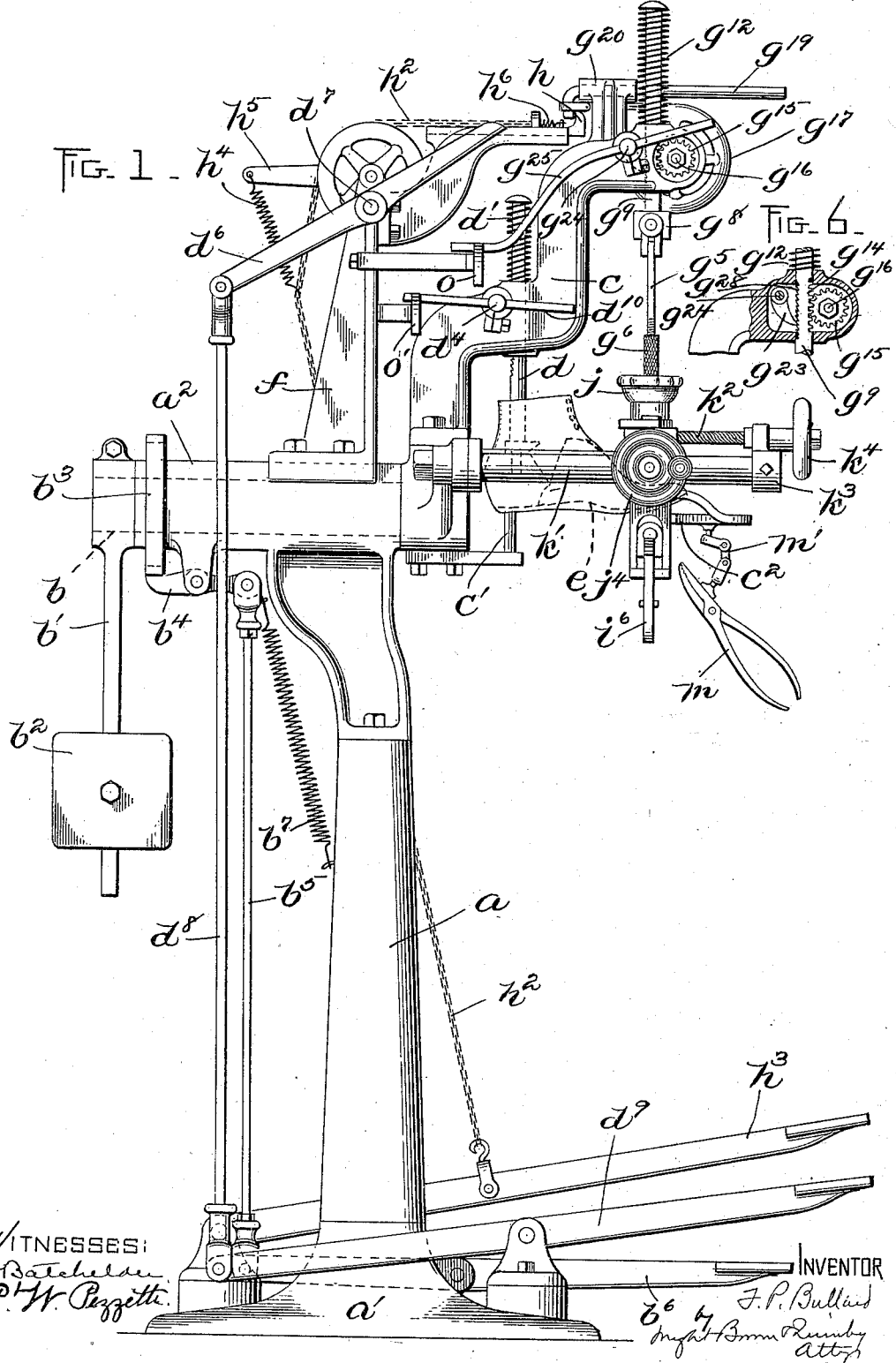

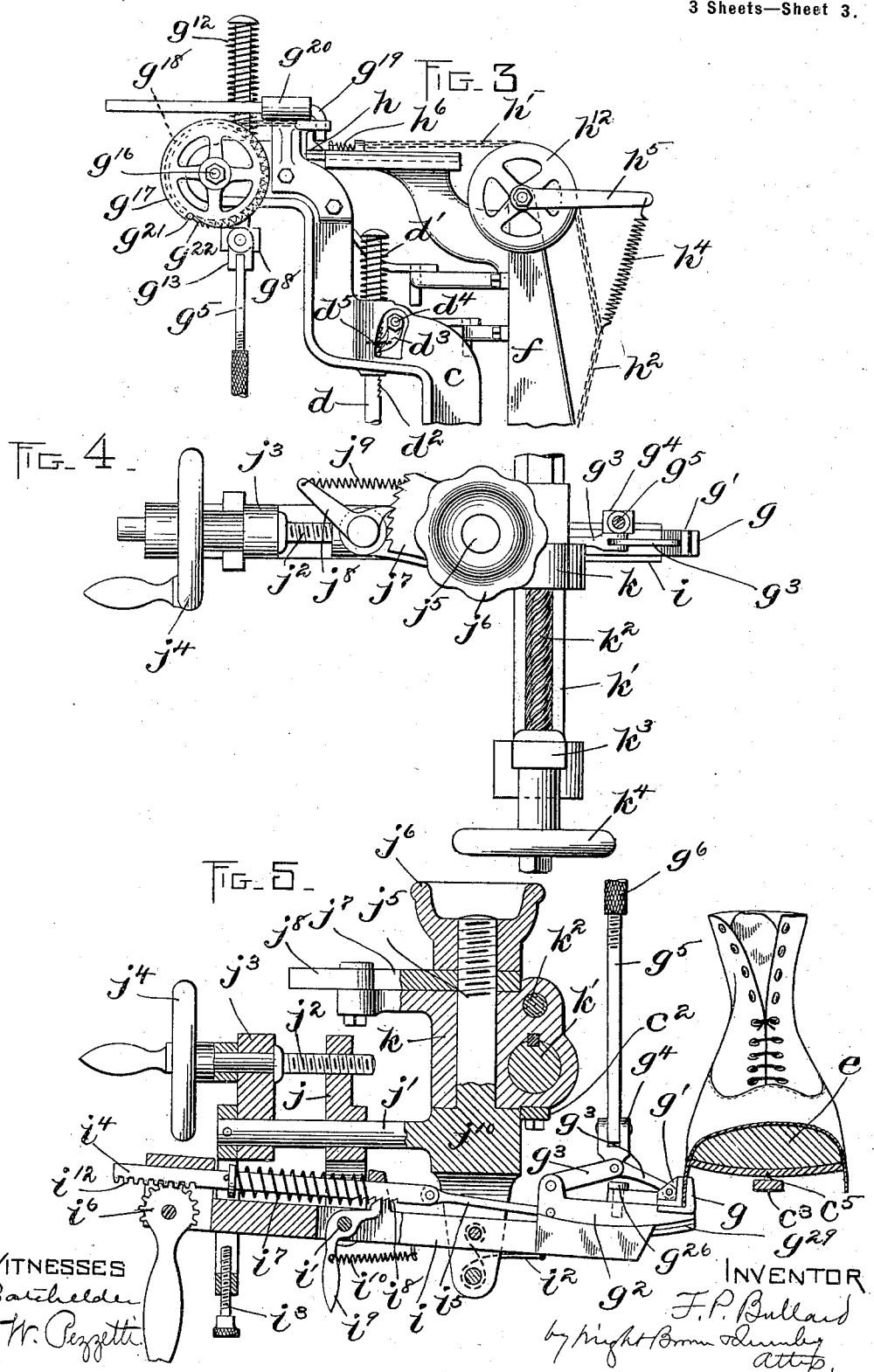

UNITED STATES PATENT OFFICE.

FRED P. BULLARD, OF BROCKTON, MASSACHUSETTS, ASSIGNOR TO AUGUSTUS SEAVER, OF BOSTON, MASSACHUSETTS.

MACHINE FOR STRETCHING UPPERS.

SPECIFICATION forming part of Letters Patent No. 635,124, dated October 17, 1899.

Application filed January 3, 1899. Serial No. 700,895. (No model.)

*To all whom it may concern:*

Be it known that I, FRED P. BULLARD, of Brockton, in the county of Plymouth and State of Massachusetts, have invented certain new and useful Improvements in Machines for Stretching Uppers, of which the following is a specification.

This invention relates in general to lasting-machines or machines for stretching the uppers of boots and shoes, such as that shown and described in Letters Patent of the United States No. 596,325, granted to William S. Hamm December 28, 1897. The machine in said patent is characterized by last-jacking and upper grasping and stretching mechanisms carried on a frame or support which is reversible for the purpose of readily performing the successive lasting operations.

This invention has for its object to provide mechanism for automatically unjacking the last and mechanism for automatically releasing the upper grasping and stretching devices, said mechanisms being operated by the rotation of the aforesaid frame or support.

The invention further has for its object to improve the upper grasping and stretching mechanism.

With these ends in view the invention consists in the improvements which I shall now proceed to describe and claim.

Of the accompanying drawings, forming a part of this specification, Figure 1 represents a side elevation of an upper-stretching machine constructed in accordance with my invention. Fig. 2 represents a front elevation thereof. Fig. 3 represents a view in side elevation of parts shown in Fig. 1, looking from the other side of the machine. Fig. 4 represents a detail plan view, on an enlarged scale, of a portion of the upper grasping and stretching mechanism. Fig. 5 represents a vertical sectional view of said portion. Fig. 6 represents a detail sectional view showing the lock for the jack-rod. Fig. 7 represents a detail plan view of the toe-rest and adjacent parts.

The same reference characters indicate the same parts in all the figures.

In the drawings I have not represented any gripping mechanism such as is usually employed for drawing the upper over the last at the shank portion thereof, as my present invention can be described without illustrating such mechanism.

$a$ is a standard mounted upon a suitable base $a'$ and formed or provided at its upper end with a horizontal bearing-sleeve $a^2$, which journals a shaft $b$. To the forward end of the latter is secured the frame $c$, which supports the jacking and upper-stretching mechanisms, and to the rear end of said shaft is secured an arm $b'$, carrying an adjustable counterweight $b^2$.

$b^3$ is a notched flange or collar secured to the shaft $b$, and $b^4$ is a pivotal dog connected by a rod $b^5$ with a treadle $b^6$ and having a spring $b^7$, which tends to maintain it in connection with one or another of the notches in the flange $b^3$. By depressing the treadle $b^6$ the frame $c$ is released and may be rotated to bring the last which it supports into an upright position, as shown in Fig. 1, or into an inverted position with the sole uppermost.

$c'$ is a heel-rest or step bolted to the frame $c$, and $c^2$ is a toe-rest mounted as hereinafter described and supporting the toe of the last. To hold the last against these steps, a jack-rod $d$ is provided, said rod sliding vertically in a bearing in the frame $c$ and having a spring $d'$, which normally projects it away from the last. A jack-lever $d^6$, pivoted at $d^7$ to a support $f$, bolted on the upper side of the bearing-sleeve $a^2$ and connected by a rod $d^8$ with a treadle $d^9$, operates when said treadle is depressed to strike the head of the jack-rod $d$ and depress the same into engagement with the last. The jack-rod is formed with a series of ratchet-teeth $d^2$, which are engaged by a pawl $d^3$, said rod being thereby held in the position to which it is moved by the treadle. The pawl $d^3$ is pivoted on a stud $d^4$ and provided with a spring $d^5$ to hold it in engagement with the ratchet-teeth.

On each side of the last is mounted a pair of gripping-jaws $g$ $g'$ for grasping the edges of the upper and stretching the upper over the last and insole. One of the gripper mechanisms is illustrated in Fig. 5 and is organized as follows: The jaw $g$ is made integral with a sliding block $g^2$, and the jaw $g'$ is mounted to slide on said block and is held thereto by a retaining guide-pin $g^{26}$. $g^3$ $g^3$ are the two arms of a toggle connected with the movable jaw $g'$ and with the block $g^2$, and $g^4$ is a knuckle-block pivoted to the junction of said toggle-arms and to the lower end of a vertical rod $g^5$. The rods $g^5$ on the two sides of the machine are connected to the ends of a cross-head $g^8$, attached to a slide-rod $g^9$, which is supported in a bearing-sleeve $g^{10}$ on the upper end of the frame $c$, a spring $g^{12}$ being provided to normally raise the cross-head and its attached parts. The rods $g^5$ are each made in two pieces, with oppositely-screw-threaded ends engaged by an adjusting sleeve or nut $g^6$, and the upper end of each rod is attached by a double-hinge connection $g^{13}$ to the end of the cross-head $g^8$ to allow for universal movement of the lower end of said rod. To reciprocate the rod $g^9$, carrying the cross-head, the said rod is formed with rack-teeth $g^{14}$, engaged by the teeth of a pinion $g^{15}$, mounted on a stud $g^{16}$. At the end of the latter is attached a wheel or pulley $g^{17}$, which is connected by a chain $g^{18}$ with the downwardly-turned end of a horizontal sliding bar $g^{19}$. The latter is journaled in a sleeve $g^{20}$, bolted to the frame $c$. The chain $g^{18}$ occupies a peripheral groove in the pulley $g^{17}$ and has at its end a short cross bar or stud $g^{21}$, which engages a notch in the periphery of the pulley, so that when the slide-rod $g^{19}$ is drawn to the rear the said stud engages the said notch and the pulley is rotated. A helical spring $g^{22}$, laid in the pulley-groove and attached to the pulley and to the chain $g^{18}$, serves to take up slack in the latter when the rod $g^{19}$ is in its normal position. The slide-rod $g^{19}$ is retracted and the grippers thereby operated by means of treadle mechanism, including a slide-rod $h$, mounted in guides on the upper end of the standard $f$ and having an upwardly-projecting lug at its end adapted to engage the end of the rod $g^{19}$, and a chain $h^2$, attached to the slide $h$ and passing over a guide-pulley $h^{12}$ to a treadle $h^3$. The chain $h^2$ is provided with a spring $h^4$, attached to the end of a fixed arm $h^5$, whereby the chain is supported when slack. A spring $h^7$ raises the treadle. The slide $h$ is returned to its normal position after being retracted by means of a spring $h^6$. On the edge of the rod $g^9$ are formed ratchet-teeth $g^{28}$, engaged by a pawl $g^{23}$, mounted on a stud $g^{24}$ in the frame $c$. Said pawl is normally held in engagement with the said ratchet-teeth by means of a spring $g^{27}$, Fig. 2, surrounding the stud $g^{24}$ and attached thereto and to the frame $c$. The slide $g^2$ is provided with guides $g^{29}$, shaped in the arc of a circle and engaging guides formed on the end of the lever $i$, pivoted at $i'$ to a block $j$. This block $j$ is mounted to slide on a bar $j'$, projecting laterally from a block $j^{10}$, and adjusting means are provided whereby said block $j$ and the pivotal arm $i$ may be moved longitudinally with respect to the block $j^{10}$, said means including a screw $j^2$, engaging the block $j$ and mounted on a bearing-block $j^3$, which is attached to the end of the bar $j'$. On the end of the screw is a hand-wheel $j^4$ for rotating said screw $j^2$. By turning this hand-wheel it will readily be seen that the grippers $g\ g'$ may be adjusted laterally to correspond to the different widths of shoes which are lasted. A spring $i^2$ normally projects the gripper-carrying end of the lever $i$ upwardly, and a screw-stop $i^3$ limits the upward motion of the grippers.

In operating to stretch the upper over the last the first downward movement of the rod $g^5$ causes the grippers $g\ g'$ to close together and grip the edge or fringe of the upper, and a further downward movement of said rod depresses the grippers bodily and causes the upper to be stretched.

The block $j^{10}$ is provided with a screw-threaded shank or spindle $j^5$, journaled in a slide-block $k$, which latter is splined to a rod $k'$, bolted on the frame $c$, and is adapted to be moved along said rod by means of a screw $k^2$, engaging the slide-block and journaled in a block $k^3$, secured to the end of said rod $k'$. The screw $k^2$ is rotated by means of a hand-wheel $k^4$ and operates to move the grippers bodily longitudinally of the last to pull the upper forward. For the purpose of pulling the edge of the upper over the last to be tacked mechanism is provided, including a rod $i^4$, mounted to slide in guides on the pivotal arm $i$ and connected by a link $i^5$ with the gripper-block $g^2$. A spring $i^7$ normally retracts the rod $i^4$, and a pivotal hand-lever $i^6$, formed with a gear-segment on its hub, engaging rack-teeth $i^{12}$ on the rod $i^4$, is provided for moving the rod to project the grippers toward the last. When said grippers are thus projected, the segmental guide $g^{29}$ causes them to approach the insole in a curved path, as will be readily understood. The rod $i^4$ is held in the position to which it is moved by means of a pivotal dog $i^9$, engaging ratchet-teeth $i^8$, formed on the rod $i^4$. Said dog is formed with a handle and provided with a spring $i^{10}$, which holds it in engagement with the ratchet-teeth. The upper end of the spindle $j^5$, journaled in the block $k$, is provided with a clamping-nut $j^6$ and with a segmental ratchet $j^7$, engaged by a pawl $j^8$, having a retaining-spring $j^9$. The block $j^{10}$, carrying the grippers, may be turned on its pivot to bring the grippers parallel with the edge of the last and when adjusted is held in position by means of the nut and ratchet and pawl.

The operation of the machine is as follows: The last $e$, with an upper and insole in position, is placed on the steps or rests $c'\ c^2$ and is jacked up by depressing the treadle $d^9$, the jack-rod being automatically locked, as previously described. The edges of the upper are then slipped into the open gripper-jaws, and the treadle $h^3$ is depressed to cause said grippers to grasp and stretch the upper. The operator then manipulates the hand-wheels $k^4$ to draw the edges of the upper forward on the last. This latter operation is supplemented by the employment of lasting-pincers $m$, connected with the toe-rest $c^2$ by a fulcrum connection $m'$ in order to last over the toe portion of the upper. Additional gripping members for grasping the upper at the shank portion and drawing it over the last may also be employed and operated in any suitable manner; but as these form no part of my present invention I have not illustrated the same. The rod $g^9$ is automatically locked in position, as hereinbefore described, by means of its pawl $g^{23}$, so as to hold the grippers in grasping and stretching condition. The last may now be inverted by depressing the treadle $b^6$ and releasing the frame $c$, which is rotated to invert the last and bring the sole of the last uppermost. After inverting the last the operator swings the levers $i^6$ outwardly, and thereby draws the edges of the upper inwardly over the last in a position to be tacked. After the tacking operation is completed the reversible frame $c$ is returned to its original position, and the rods $g^9$ and $d$ are automatically released by the action of two cams $o$ $o'$, secured to the standard $f$ and engaging trip-levers $d^{10}$ and $g^{25}$, secured to the studs or shafts $d^4$ and $g^{24}$ of the respective locking-pawls $d^3$ and $g^{23}$. The action of the cams on the trip-levers releases the pawls from engagement with the ratchet-teeth on the rods $g^9$ and $d$ and allows the springs surrounding the upper ends of said rods to retract the latter. The retraction of the jack-rod $d$ unjacks the last and permits its removal, and the retraction of the rod $g^9$ automatically releases the hold of the grippers $g$ $g'$ on the edge of the upper. The operator finally manipulates the dogs $i^9$ to release the rods $i^4$, and the last may then be removed from the rests $c$ $c^2$.

In Fig. 7 the construction of the toe-rest is shown in detail. $c^2$ is a curved frame or bar bolted to the slide-block $k$, as shown in Fig. 5, and supporting at its middle part a sleeve $c^6$, in which is mounted a slide $c^3$. The latter carries a point $c^5$ at its forward end to engage the under side of the last or of the insole. A spring $c^4$ normally retracts the slide $c^3$, but allows the same to remain in its proper position, supporting the toe of the last when the slide-blocks $k$ $k$ are moved to draw the upper forward on the last.

It will be observed that a very advantageous disposition of the parts is made in my improved lasting-machine. In machines heretofore constructed most of the gripper-actuating mechanism has been so situated as to obstruct in a great degree free access to the sole of the last for the purpose of performing the tacking operation. In the present machine, however, the gripper and jack operating mechanisms, when the last is upright, are practically all above the sole of the last, so that when the last-support is reversed to bring the last-sole uppermost the space above the sole is clear of obstructions.

Having thus explained the nature of my said invention and described a way of constructing and using the same, although without having attempted to set forth all the forms in which it may be embodied or all the modes of its use, I declare that what I claim is—

1. In a machine for stretching uppers, the combination of a frame rotatively mounted for reversibility, last-jacking and upper-stretching mechanisms carried by said frame, means for actuating said jacking mechanism to jack the last, and means operated automatically by the rotation of the frame, for actuating said mechanism to unjack the last.

2. In a machine for stretching uppers, the combination of a frame rotatively mounted for reversibility, an upper-stretching mechanism carried thereby, a jack-rod carried thereby, means for operating said rod to jack the last, a lock associated with said rod for holding the last jacked, and means on a fixed support, operating on said lock when the frame is rotated, to release said jack-rod.

3. In a machine for stretching uppers, the combination of a frame rotatively mounted for reversibility, an upper-stretching mechanism carried thereby, a jack-rod carried thereby, an operating member on a fixed support adapted to actuate said rod to jack the last, an automatic lock associated with said rod for holding the last jacked, and means on a fixed support operating on said lock when the frame is rotated, to release said jack-rod.

4. In a machine for stretching uppers, the combination of a frame rotatively mounted for reversibility, an upper grasping and stretching mechanism carried thereby, means for operating said mechanism to grasp and stretch the upper, and means operated automatically by the rotation of the frame, for actuating said upper-stretching mechanism to release the upper.

5. In a machine for stretching uppers, the combination of a frame rotatively mounted for reversibility, an upper grasping and stretching mechanism carried thereby, means for operating said mechanism to grasp and stretch the upper, a lock associated with said mechanism for holding the same in grasping and stretching condition, and means on a fixed support operating on said lock when the frame is rotated, to release said mechanism.

6. In a machine for stretching uppers, the combination of a frame rotatively mounted for reversibility, upper grasping and stretching mechanism carried thereby, means on a fixed support for operating said mechanism to grasp and stretch the upper, said means and said mechanism having disconnected parts which interlock for combined movement relative to the reversible frame without obstructing rotary movement of the latter, and means operated automatically by the rotation of the frame for actuating said upper grasping and stretching mechanism to release the upper.

7. In a machine for stretching uppers, the combination of a last-support, a pair of grippers, means for moving the same to stretch the upper vertically, a member carrying said grippers and having a guide whereon the grippers slide to carry the upper inwardly over the last, a block carrying said member, a screw adjustment for said block, and means for moving the grippers with respect to said member.

8. In a machine for stretching uppers, the combination of a last-support, a slide $g^2$, a pair of grippers mounted thereon, a member carrying said slide and having a guide arranged to direct the grippers and slide inwardly and vertically toward the last, said member being mounted to move vertically to permit the vertical stretching of the upper, means for moving the slide with respect to said member, a toggle for actuating the grippers, and means for simultaneously operating said toggle and moving the grippers vertically to stretch the upper.

9. In a machine for stretching uppers, the combination of a heel-rest for the last, upper-grippers mounted on opposite sides of the last, supporting means for said grippers movable longitudinally of the last to pull the upper forward thereon, and a toe-rest carried by said supporting means and movable with respect thereto to permit the forward movement of the grippers.

In testimony whereof I have affixed my signature in presence of two witnesses.

FRED P. BULLARD.

Witnesses:
  C. F. BROWN,
  E. BATCHELDER.